United States Patent [19]
Fey et al.

[11] Patent Number: 5,483,137
[45] Date of Patent: Jan. 9, 1996

[54] CONTROL DEVICE

[75] Inventors: Rainer Fey, Schweinfurt; Albert Thein, Hassfurt, both of Germany

[73] Assignee: Fichtel & Sachs AG, Schweinfurt, Germany

[21] Appl. No.: 31,526

[22] Filed: Mar. 15, 1993

[30]    Foreign Application Priority Data

Apr. 13, 1992 [DE] Germany .................... 42 12 319.4

[51] Int. Cl.[6] .............................. H02P 17/00; F16H 9/00
[52] U.S. Cl. ..................... 318/560; 318/565; 318/600; 128/670; 128/689; 474/71; 474/81; 474/78
[58] Field of Search ................ 318/3, 16, 560–646; 280/236, 238; 180/206; 364/900; 474/110, 81, 78, 80, 79, 70, 69, 71; 128/689, 670; 272/73

[56]             References Cited

U.S. PATENT DOCUMENTS

| | | | |
|---|---|---|---|
| 4,115,942 | 9/1978 | Sears | 40/547 |
| 4,123,796 | 10/1978 | Shih | 364/900 |
| 4,358,105 | 11/1982 | Sweeney, Jr. | 272/73 |
| 4,408,613 | 10/1983 | Relyea | 128/670 |
| 4,434,801 | 3/1984 | Jiminez et al. | 128/689 |
| 4,443,008 | 4/1984 | Shimano | 272/73 |
| 4,490,127 | 12/1984 | Matsumoto et al. | 474/110 |
| 4,605,240 | 8/1986 | Clem et al. | 280/236 |
| 4,633,216 | 12/1986 | Tsuyama | 340/134 |
| 4,635,031 | 1/1987 | Blomberg et al. | 340/52 R |
| 4,636,769 | 1/1987 | Tsuyama | 340/134 |
| 4,642,606 | 2/1987 | Tsuyama | 340/134 |
| 4,941,652 | 7/1990 | Nagano et al. | 272/73 |
| 5,024,286 | 6/1991 | Lean et al. | 180/206 |
| 5,027,303 | 6/1991 | Witte | 364/511 |
| 5,059,158 | 10/1991 | Bellio et al. | 474/70 |
| 5,213,548 | 5/1993 | Colbert et al. | 474/71 |
| 5,261,858 | 11/1993 | Browning | 474/69 |
| 5,266,065 | 11/1993 | Restelli | 474/78 |

FOREIGN PATENT DOCUMENTS

| | | |
|---|---|---|
| 2041576 | 9/1980 | United Kingdom . |
| 2172725 | 9/1986 | United Kingdom . |
| 2183975 | 6/1987 | United Kingdom . |
| WO9117078 | 11/1991 | WIPO . |

*Primary Examiner*—Paul Ip
*Attorney, Agent, or Firm*—Brumbaugh, Graves, Donohue & Raymond

[57]             ABSTRACT

A control device for controlling at least one adjustment member, in particular an electrical chain transfer of a bicycle, is proposed. The control device comprises a signal transmitter which is disposed at a location distant from the at least one adjustment member and which can be set by a user into a plurality of shift settings, in particular gears, for setting the at least one adjustment member into a plurality of operational positions, and at least one signal line for transmitting signals between the signal transmitter and the respective adjustment member. The control device of the invention has a first signal monitoring unit, assigned to the signal transmitter and connected with the at least one signal line, for monitoring the signals to be transmitted to the at least one adjustment member, and a second signal monitoring unit per adjustment member and assigned to the respective adjustment member and also connected with the at least one signal line, for monitoring the signals transmitted by the signal transmitter.

21 Claims, 3 Drawing Sheets

CONTROL DEVICE

BACKGROUND OF THE INVENTION

The invention relates to a control device for controlling at least one adjustment member, in particular an electrical chain transfer of a bicycle, where the control device comprises a signal transmitter which is disposed at a location distant from the at least one adjustment member and which can be set by a user into a plurality of shift settings, in particular gears, for setting the at least one adjustment member into a plurality of operational positions, and at least one signal line for transmitting signals between the signal transmitter and the respective adjustment member.

STATEMENT OF THE PRIOR ART

An electrical chain transfer for a bicycle, for example, is known as such a control device. In this known chain transfer, a signal transmitter disposed on the handlebars of the bicycle is connected via a signal line with an adjustment member, namely an electrical chain transfer device, fastened in the area of the rear wheel hub. For shifting, the rider of the bicycle selects a desired gear by means of the signal transmitter, whereupon a signal corresponding to this gear is transmitted to the adjustment member. A sensor provided in the adjustment member detects the instantaneous operational position of the adjustment member and sends a signal corresponding to the operational position to the signal transmitter. When a position of the adjustment member corresponding to the desired gear has been reached, the signal transmitter deactivates the adjustment member by means of a stop signal.

In accordance with the above, a large amount of signals is transmitted back and forth between the adjustment device and the signal transmitter. The susceptibility to interference by noise of the known control device is relatively great because of the long signal path. In addition, it may happen that because of the great signal length the stop signal cannot be transmitted from the signal transmitter to the adjustment member at a time required for the optimal adjustment of the adjustment member, because the last signal transmission from the adjustment member to the signal transmitter has not yet ended.

OBJECT OF THE INVENTION

In contrast to this it is the object of the invention to provide a control device of the type mentioned above, which has greater security against interference and an improved adjustability of the operational positions of the adjustment member.

SUMMARY OF THE INVENTION

This object is attained in accordance with the invention in that the control device comprises a first signal monitoring unit, assigned to the signal transmitter and connected with the at least one signal line, for monitoring the signals to be transmitted to the at least one adjustment member, and a second signal monitoring unit per adjustment member and assigned to the respective adjustment member and also connected with the at least one signal line, for monitoring the signals transmitted by the signal transmitter. In accordance with the invention, the functions customarily performed only by the signal transmitter can be divided among the signal monitoring units. Therefore, in connection with functions which are exclusively performed in the signal monitoring unit assigned to the adjustment member, the amount of signals transmitted to the signal transmitter customarily associated with these functions can be omitted. Because of the reduced amount of signals it is also possible in accordance with the invention to reduce the frequency of errors caused by noise.

To prevent that nonsensical shifting selections by the user result in attempts of the adjustment member to make adjustments, such as when the user attempts to upshift one more gear while riding in the highest gear, it is proposed that the first signal monitoring unit comprises a memory device in which preset permissible target shift settings are stored for each shift setting of the signal transmitter, and that it further comprises a comparator for comparing a new shift setting selected by the user with the target shift settings permissible for the instantaneous shift setting, where the signal transmitter transmits a shift command signal to the at least one adjustment member only if the comparator has detected agreement of the desired shift setting with one of the permissible target shift settings.

In order to make it possible to alert the user to the unacceptability of his shift selection, it has been provided that the signal transmitter has a display device, where a message "unacceptable shift command" is shown on the display device if the comparator has not detected agreement between any of the permissible target shift settings and the desired shift setting.

If the at least one, second signal monitoring unit comprises a memory device in which for each operational setting of the respective adjustment member a set adjusting value for the adjustment member corresponding to this operational position is stored, it is possible to omit a mechanical detent device for adjusting the adjustment member into a desired operational position.

In a further development of this embodiment it has been provided that the adjustment member has a sensor for detecting an instantaneous actual adjustment value of the adjustment member, where the sensor is connected with the second signal monitoring unit for transmitting the detected actual adjustment value, and that the second signal monitoring unit has a comparator for comparing the instantaneous actual adjustment value with a set adjustment value corresponding to a target shift setting by calculating the difference between the actual adjustment value and the set adjustment value, where the control device triggers the adjustment member in accordance with this difference. Accordingly, it is possible to perform the set value/actual value comparison between a desired position and the instantaneous position of the adjustment member by means of the second signal monitoring unit, without signal transmission to the signal transmitter being required for this. It is therefore possible to achieve further reduction of the amount of signals and an increase in the protection from interference.

To make it possible to inform the user of the correct execution of the shift command, it has been proposed that the second signal monitoring unit transmits a signal "command executed" to the first signal monitoring unit when the comparator determines the agreement of the instantaneous actual adjustment value with the predetermined set adjustment value.

The user can be alerted to the fact that a permissible shift command cannot be performed for some reason, for example a defect in the adjustment member, by the transmission of a signal "command cannot be executed" from the second signal monitoring unit to the first signal monitoring unit, when the comparator has determined that the adjustment member cannot be adjusted to the predetermined set adjusting value.

To be able in this case to prevent damage to the adjustment member because of an overload, it has been provided that the control device deactivates the adjustment member when the comparator has determined that the adjustment member cannot be adjusted to the predetermined set adjusting value.

In an embodiment, a monitoring device for monitoring a malfunction of the adjustment member can be realized in that the second signal monitoring unit has a time function element which can be set to a predetermined time period as a function of a transmitted shift signal, and can be stopped as a function of an agreement, detected by the comparator, between the instantaneous actual adjustment value and the predetermined set target adjustment value, and that the second signal monitoring unit transmits the signal "command cannot be executed" to the first signal monitoring unit after the predetermined time period has elapsed. The predetermined time period can be selected in this case to be long enough that a shift command can be normally executed within this time period.

In an embodiment which is alternative to this it has been provided that the adjustment member has a current sensor connected with the second signal monitoring unit and that the second signal monitoring unit transmits the signal "command cannot be executed" to the first signal monitoring unit if the detected current value exceeds a preset value. By means of this it is possible to prevent an overload on the drive unit of the adjustment member because of too high current intensity.

It can be additionally or alternatively provided for an electrical chain transfer device of a bicycle that the adjustment member has a chain movement sensor, connected with the second signal monitoring unit, for detecting the running speed of a chain of a bicycle, and that the second signal monitoring unit transmits the signal "command cannot be executed" to the first signal monitoring unit if the value of the detected running speed falls below a preset value. By means of this it is possible to detect a shift attempt, which is destined to fail from the beginning because the rider does not move the pedals, before it is executed and its execution can be suppressed.

To be able to make signals transmitted via the signal line less sensitive to noise interference, it has been provided that the signal line is designed for digital signal transmission.

To be able to use as low as possible a number of line wires, it has been proposed that the signal line is designed for serial signal transmission. In this case the signal line can be designed in the conventional manner for electrical signal transmission, or alternatively for optical signal transmission as an optical light guide, particularly as a fiberglass cable.

To be able to make do with a reduced number of lines even when there is a plurality of adjustment members, it has been proposed to provide a single signal line with which all signal monitoring units assigned to the signal transmitter and the adjustment members are connected.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be described in detail below by means of exemplary embodiments shown in the attached drawings. Shown are in.

DETAILED DESCRIPTION OF PREFERRED EMBODIMENTS

Figure 1:
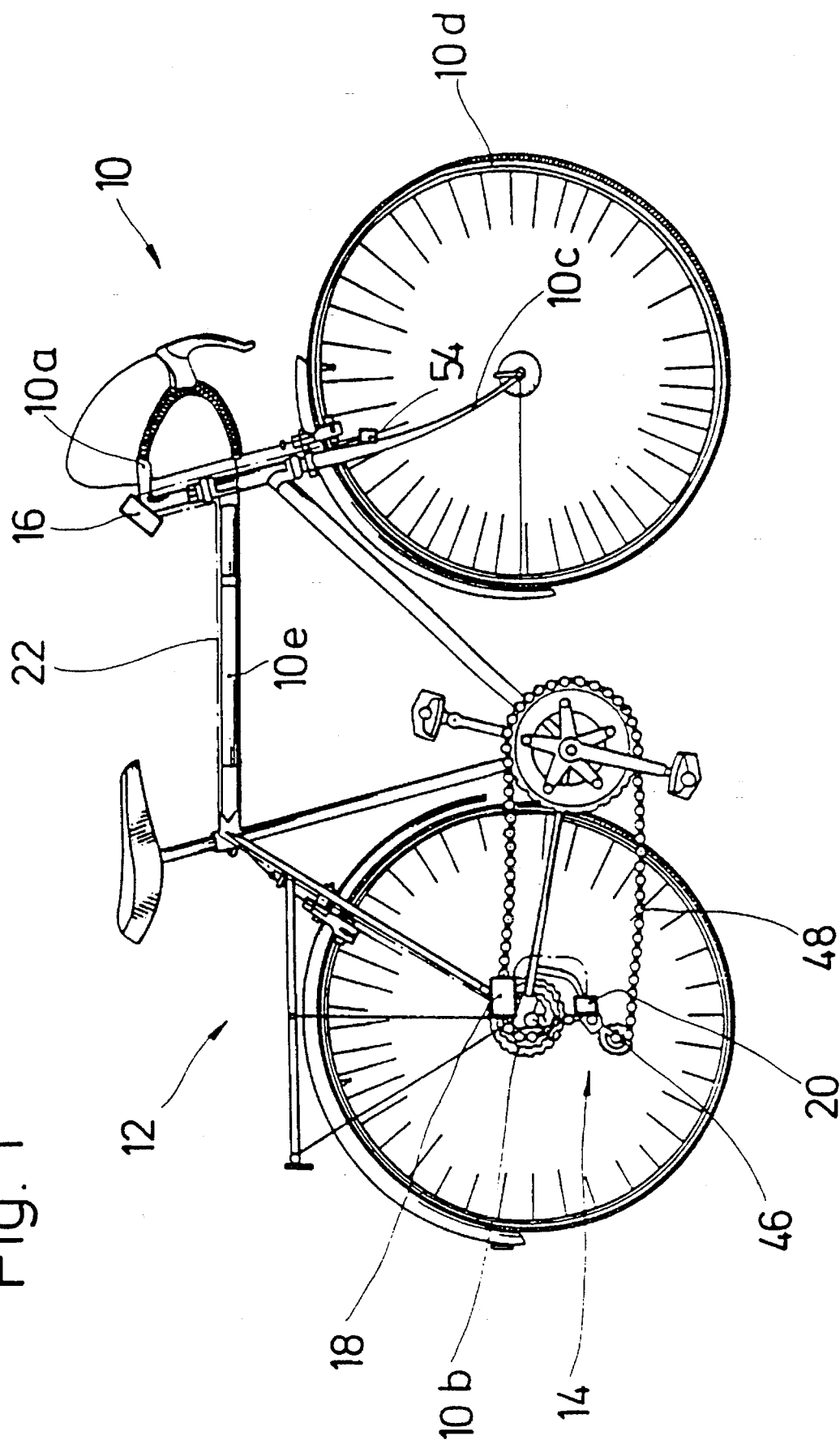
FIG. 1, a lateral view of a bicycle equipped with a control device for an electrical chain transfer device.

A lateral view of a bicycle, identified by 10 hereinbelow, is shown in FIG. 1, which is equipped with a control device 12 for an electric chain transfer device 14. The control device 12 comprises a signal transmitter 16 disposed on the handle bar 10a of the bicycle, by means of which the rider of the bicycle 10 can enter a desired new gear for a gear change, and a control unit 18 disposed in the area of the rear wheel hub 10b for controlling the adjustment member 20 of the chain transfer device 14. The signal transmitter 16 and the control unit 18 are connected with each other via a signal line 22.

The structure and function of the control device will be discussed in detail in what follows by means of FIG. 2.

The signal transmitter 16 comprises an input unit 30, for example a keyboard, by means of which the rider can enter different commands into the signal transmitter 16. For example, during normal riding he can indicate by pushing an "up" key 30a or a "down" key 30b that he wants to ride in the next higher or next lower gear. The entered commands are forwarded by the input unit 30 to a signal monitoring unit 32, which checks the permissibility of the preset shift command. For this purpose the signal monitoring unit 32 has a comparator 38 which compares the desired gear with the gears contained in a multitude of target gears permissible for the presently selected gear. Such a number of permissible target gears is stored for each one of the possible gears of the chain transfer in a memory device 34. An example of such numbers of target gears is shown in Table 1. For example, it is not permissible in accordance with Table 1 to shift from first gear into third gear. In addition, nonsensical shifting attempts, such as shifting into a non-available fifth gear, are intercepted.

TABLE 1

| Possible Gears | Permissible Target Gears |
| --- | --- |
| 1 | 2 |
| 2 | 1, 3 |
| 3 | 2, 4 |
| 4 | 3 |

If the entered gear is considered to be permissible by the signal monitoring unit 32, an appropriate shift command is forwarded via the signal line 22 to the control unit 18 of the chain transfer device 14. In addition, the permissibility of the desired gear is indicated on a display device 36 of the signal transmitter 16, perhaps by means of a blinking indication of a number corresponding to the desired gear. The display device 36 can be formed by a liquid crystal display, for example.

Once the issued shifting command has been successfully executed by the chain transfer device 14, a signal "command executed" is forwarded to the signal monitoring unit 32. The rider of the bicycle is informed of the successful execution of the switching command by the change of the display device from a blinking to a steady display, for example.

The above described switching command is received by a second signal monitoring unit 40 in the control unit 18. The signal monitoring unit 40 transmits an adjusting signal corresponding to this switching command to a drive device 42 of the adjustment member 20, which thereupon changes an adjusting element 44 of the adjustment member 20.

Figure 2:
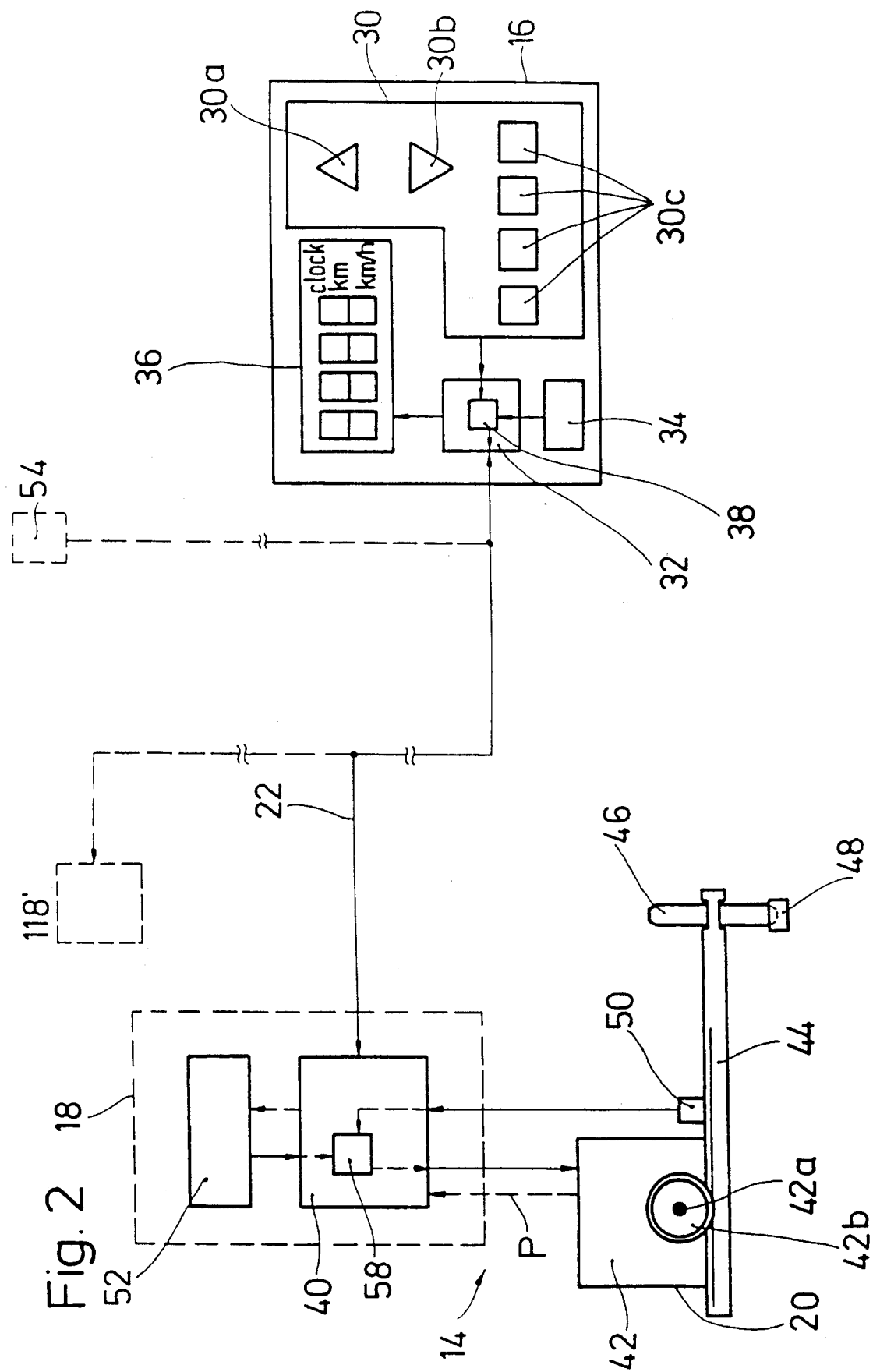
FIG. 2, a schematic view for explaining the function of the control device of the invention.

In FIG. 2 the drive device is schematically shown as an electric motor 42, the output shaft 42a of which is connected with a toothed wheel 42b. The toothed wheel 42b engages the toothing of the adjusting element 44, which is embodied as a toothed rack. A toothed wheel 46 is rotatably seated on one end of the toothed rack 44 and the drive chain 48 of the bicycle 10 is guided over it (also see FIG. 1).

A position detector 50 detects an instantaneous position of the adjusting element 44 and forwards a respective signal to the second signal monitoring unit 40. A comparator 58 provided in the signal monitoring unit 40 compares the actual adjustment value forwarded by the position detector 50 with a set adjustment value for the gear to be newly selected and stored in a memory device 52. If the signal monitoring unit 40 determines the agreement of the set and the actual values, it deactivates the adjustment member 20 and forwards the previously mentioned signal "command executed" to the first signal monitoring unit 32.

It may happen that for some reason the adjustment member 20 is not in a position to set the desired gear. This may happen, for example, because the adjustment member 20 is blocked by dirt or the adjustment member 20 must overcome too high an adjustment resistance because the chain 48 of the bicycle is not being moved fast enough. If no allowances have been made for this case, the drive device 42 of the adjustment member 20 may be permanently damaged because of the continuing attempts to set the desired gear.

To be able to prevent such damage, the second monitoring unit 40 can be provided, for example, with a time function element which, when a switching signal is transmitted, is set to a pre-determined time by the first signal monitoring unit 32 and is started, and which is stopped again when the comparator 58 has detected the agreement between the actual adjusting value detected by the position detector 50 and the set value of the adjusting element 44 stored in the memory device 52. If the adjustment member 20 is unable to set the desired gear within the time set by the time function element, the adjustment member 20 is deactivated by the second signal monitoring unit 40 when the time function element has run out and a signal "command cannot be executed" is sent to the first signal monitoring unit 32. Subsequently the signal monitoring unit 32 causes the non-execution of the switching command to be displayed on the display device 36.

It is also possible to provide a current sensor in place of the time function element, which detects the intensity of the supply current for the electric motor 42 and sends an appropriate signal to the second signal monitoring unit 40 (this is indicated in FIG. 2 by the dashed arrow P). If the supply current intensity exceeds a preset value, it is again possible to deactivate the drive device 42 and to send a signal "command cannot be executed" to the first signal monitoring unit 32.

In addition to the above described function of switching back and forth between several gears of the chain transfer, the signal transmitter 16 can also take over other functions, such as display of the time, the instantaneous riding speed, the distance covered or the like. The input unit of the signal transmitter 16 is provided with function keys 30c to call up these functions. In addition, the first signal monitoring unit 32 is connected with a speed sensor 54 which is also connected to the signal line 22, which is embodied as a data bus.

For example, the speed sensor 54 can be formed by a Hall sensor, fixedly disposed on a fork 10c of the bicycle 10, and a permanent magnet-disposed on a spoke of the front wheel 10d.

Because of the division of the individual functions, which are required for correct switching, to the signal monitoring units 32 and 40, which have been disposed at places distant from each other in accordance with the concept of decentralized intelligence, namely the signal monitoring unit 32 in the signal transmitter 16 on the handlebar 10a and the second signal monitoring unit 40 in the control unit 18 in the area of the rear wheel hub 10b of the bicycle 10, the signal transmission rate via the signal line 22 can be reduced to a minimum. By means of this, falsification of the signals over the long transmission path via the signal line 22 and the danger resulting from this of a malfunction of the control device 12 is at least considerably reduced, if not completely prevented.

To be able to improve further the freedom from interference of the control device 12, the signals are transmitted via the signal line 22 not in analog, but in digital form, because digital signals are much more insensitive against noise than analog signals. To be able to keep the number of lines needed as small as possible, the signal line 22 is embodied as a serial data line. Such a signal line 22 suited for serial digital data transmission can be fashioned from a single-line fiberglass cable. However, it is also possible to use a single-line electrical cable, where the signal data as well as the status data of the signal monitoring units 32 and 40 are transmitted via its line. The frame 10e of the bicycle can be used as the connection with the ground. However, to avoid high transition resistance between the signal monitoring units 32 and 40 and the bicycle frame 10e, it is also possible to provide a second line as ground connection in the electric cable. It is possible to conduct supply voltage to the units 32 and 40 via a third line.

The chain transfer device 14 of the control device 12 is embodied in such a way that during mounting on the bicycle 10 it is first simply attached to it, without it being necessary to take into consideration the exact adjustment of the adjustment member 20 in respect to the chain wheel package of the chain transfer of the bicycle 10 to be changed by it. Adjusting of the adjustment member 20 takes place, after completion of the fastening of the chain transfer device 14 on the bicycle 10, in a separate work step, which will be described later. This makes the mounting of the chain transfer device 14 considerably more easy, because it is not necessary to watch the correct fastening and exact adjustment at the same time.

First, the signal transmitter 16 must be set into the calibration mode for calibrating the adjustment member 20. This is preferably done by the simultaneous pressing of two function keys 30c which are as far apart from each other as possible. It is possible to avoid the accidental setting of the calibration mode by this.

By pushing the "up" key 30a and the "down" key 30b, a gear to be adjusted is then selected. This is followed by entering the adjustment mode for the gear to be adjusted by pushing an appropriate one of the function keys 30c.

By pushing the "up" key 30a and the "down" key 30b it is possible in the adjusting mode to change the adjustment member 20 by means of signals transmitted via the first signal monitoring unit 32, the signal line 22 and the second signal monitoring line 40 step-by-step until the adjusting element 44 has achieved a setting optimal for the gear to be adjusted. By pushing the appropriate function key again, a signal "memorize position" is transmitted by the signal monitoring unit 32 to the second signal monitoring unit 40, whereupon it stores the actual value detected by the position detector 50 in this position in the memory device 52 as the new set value for the gear just to be adjusted. For this purpose the memory device 52 is embodied as an erasable and re-programmable fixed value memory, for example as an EEPROM.

After this the appropriate function key can be pushed again and a new gear to be adjusted can be set by means of the "up" key 30a or the "down" key 30b.

The above described method is repeated until a set value has been stored in the memory device 52 for all available gears. The calibrating mode is switched off again by renewed pushing of the two function keys which are far apart.

In order to be able to take into consideration mechanical hysteresis between the toothed wheel 42b and the toothed rack 44, it can be provided that two set adjusting values are stored for each possible gear, namely one for upshifting to this gear and one for downshifting to this gear.

The above described calibration mode is, after the mounting of the chain transfer device 14, not only used for storing the set adjusting values in the memory device 52. It is also possible to correct the set adjusting values of any arbitrary gear at any time.

Figure 3:
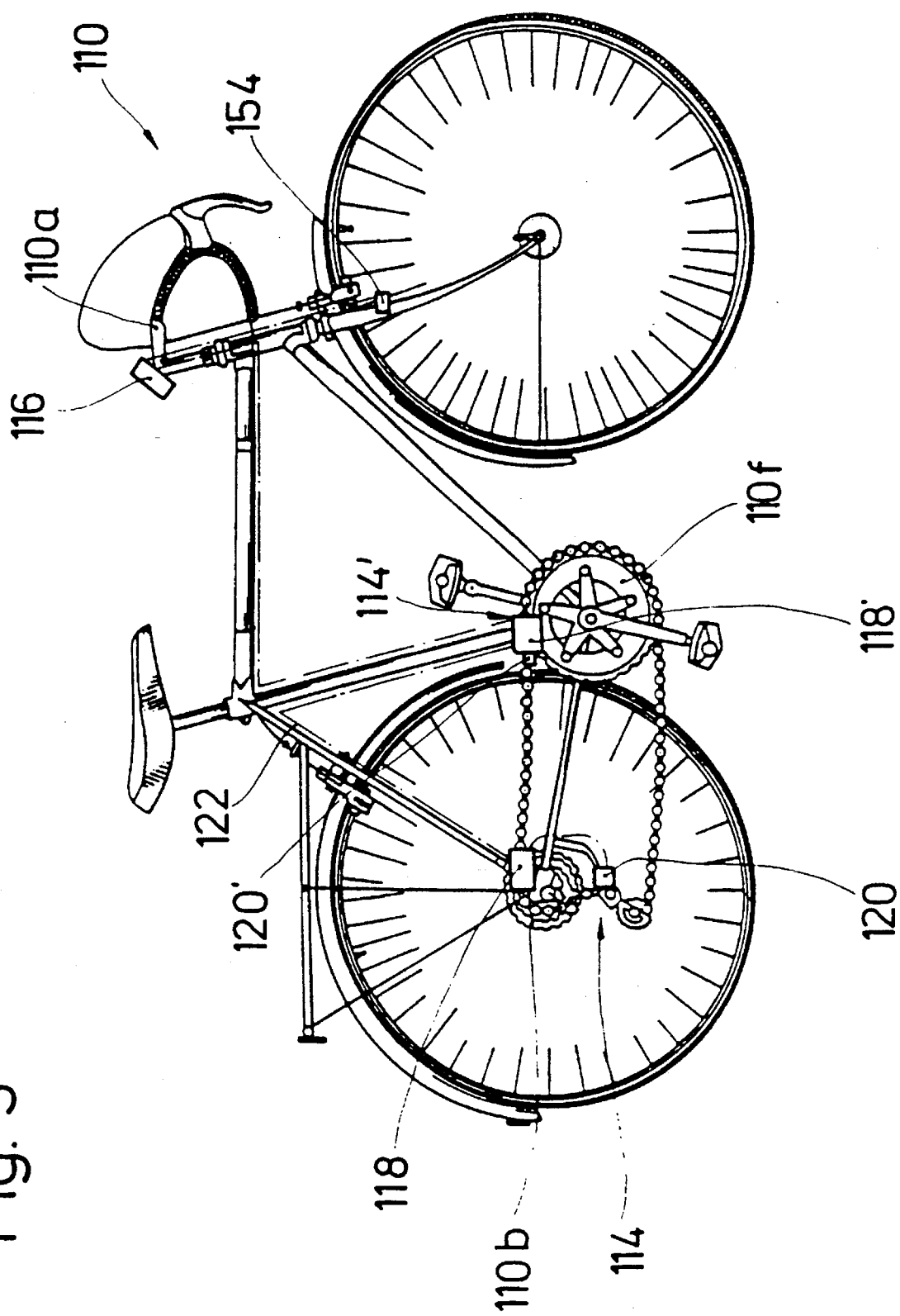
FIG. 3, a view analogous to FIG. 1 of a bicycle equipped with two adjustment devices.

A second bicycle equipped with a control device is shown in FIG. 3, where analogous parts are provided with the same reference numerals as in FIG. 1, but increased by the number 100. This bicycle will be described below only to the extent that it differs from the bicycle shown in FIG. 1. Reference is made to the above specification in other respects.

The signal transmitter 116 disposed on the handlebars 110a of the bicycle 110 illustrated in FIG. 3 is connected with two chain transfer devices 114 and 114'. The chain transfer device 114 is disposed in the area of the rear wheel hub 110b of the bicycle, while the chain transfer device 114' is disposed in the area of the large sprocket wheel 110f. The two control units 118 and 118' are connected with the signal transmitter 116 via a signal line loop 122 embodied as a data bus. The above described calibration of the two chain transfer devices 114 and 114' is performed separately for the two and in a manner analogously to the above described calibration method.

Starting with a shift request entered by the rider, the signal monitoring unit of the signal transmitter 116 determines the appropriate shift commands for the respective chain transfer device 114, 114'. These shift commands are sequentially issued, together with an identification code, to the appropriate chain transfer device, for example the chain transfer device 114. The signal is received by all control units 118, 118' of the chain transfer device. The addressed control unit, in this case the control unit 118 of the chain transfer device 114, recognizes the identification code in the signal as its own address and reads in the shift command, sends an acknowledgement to the signal transmitter 116 and executes the shift command which was sent. The other chain transfer device, in this case the chain transfer device 114' ignores the shift command. After transmitting the acknowledgement, the signal line 122 is open again for further signal transmissions, for example the transmission of the shift command to the other chain transfer device 114'.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A control device for controlling at least one adjustment member of a bicycle, the control device comprising:

signal transmitter means located distant from the at least one adjustment member and being settable by a user into a plurality of shift settings for setting the at least one adjustment member into a plurality of operational positions, signal transmission line means for transmitting signals between the signal transmitter means and the at least one adjustment member, first signal monitoring means assigned to the signal transmitter means and connected with the signal transmission line means, for monitoring the signals to be transmitted to the at least one adjustment member, said first signal monitoring means comprising comparator means for comparing a desired shift setting selected by the user with permissible target shift settings, the signal transmitter means transmitting a shift command signal to the at least one adjustment member only if the comparator means have detected agreement of the desired shift setting with one of the permissible target shift setting, second signal monitoring means per adjustment member assigned to the respective adjustment member and connected with the signal transmission line means, for monitoring the signals transmitted by the signal transmitter means and for controlling the adjustment member, said first and second signal monitoring means being located distant from each other, said first signal monitoring means being located at the signal transmitter means and said second signal monitoring means being located at the respective adjustment member.

2. A control device in accordance with claim 1, wherein the first signal monitoring means comprises memory means in which the permissible target shift settings are stored for each shift setting of the signal transmitter means.

3. A control device in accordance with claim 2, wherein the signal transmitter means have display means, a message "unacceptable shift command" being shown on the display means if the comparator means have not detected agreement between any of the permissible target shift settings and the desired shift setting.

4. A control device in accordance with claim 1, wherein the second signal monitoring means comprises memory means in which for each operational position of the respective adjustment member a set adjustment value for the adjustment member corresponding to this operational position is stored.

5. A control device in accordance with claim 4, wherein the adjustment member has sensor means for detecting an instantaneous actual adjustment value of the adjustment member, the sensor means being connected with the second signal monitoring means for transmitting the detected instantaneous actual adjustment value, and wherein the second signal monitoring means has comparator means for comparing the instantaneous actual adjustment value with a set adjustment value corresponding to a target shift setting by calculating the difference between the actual adjustment value and the set adjustment value, the control device triggering the adjustment member in accordance with this difference.

6. A control device in accordance with claim 5, wherein the second signal monitoring means transmits a signal "command executed" to the first signal monitoring means when the comparator means of the second signal monitoring means determine agreement of the instantaneous actual adjustment value with the set adjustment value.

7. A control device in accordance with claim 5, wherein the second signal monitoring means transmits a signal "command cannot be executed" to the first signal monitoring means, when the comparator means of the second signal monitoring means have determined that the adjustment member cannot be adjusted to the set adjusting value.

8. A control device in accordance with claim 7, wherein the control device deactivates the adjustment member when the comparator means of the second signal monitoring means have determined that the adjustment member cannot be adjusted to the set adjusting value.

9. A control device in accordance with claim 7, wherein the second signal monitoring means has time function means which can be set to a predetermined time period as a function of a transmitted shift signal, and can be stopped as a function of an agreement, detected by the comparator means of the second signal monitoring means, between the instantaneous actual adjustment value and the set adjustment value, and the second signal monitoring means transmits the signal "command cannot be executed" to the first signal monitoring means after the predetermined time period has elapsed.

10. A control device in accordance with claim 7, wherein the adjustment member has current sensor means connected with the second signal monitoring means and the second signal monitoring means transmits the signal "command cannot be executed" to the first signal monitoring means, if the detected current value exceeds a preset value.

11. A control device in accordance with claim 7, wherein the adjustment member has chain movement sensor means, connected with the second signal monitoring means, for detecting a running speed of a chain of a bicycle, and the second signal monitoring means transmits the signal "command cannot be executed" to the first signal monitoring means, if the value of the detected running speed falls below a preset value.

12. A control device in accordance with claim 1, wherein the signal transmission line means is adapted for digital signal transmission.

13. A device in accordance with claim 12, wherein the signal transmission line means is adapted for serial signal transmission.

14. A device in accordance with claim 13, wherein the signal transmission line means is adapted for electrical signal transmission.

15. A device in accordance with claim 13, wherein the signal transmission line means is adapted for optical signal transmission as a light guide, particularly a fiberglass cable.

16. A device in accordance with claim 1, wherein, when there is a plurality of adjustment members, a single signal transmission line means is provided with which all first and second signal monitoring means located at the signal transmitter means and the adjustment members are connected.

17. A control device for controlling a plurality of adjustment members of a bicycle, the control device comprising:

signal transmitter means located distant from the plurality of adjustment members and being settable by a user into a plurality of shift settings for setting the plurality of adjustment members into a plurality of operational positions, single signal transmission line means for transmitting signals between the signal transmitter means and the plurality of adjustment members, the signal transmitter means and the plurality of adjustment members being connected to said single signal transmission line means, said signal transmission line means being adapted for digital signal transmission, and first signal monitoring means assigned to the signal transmitter means and connected with the signal transmission line means, for monitoring the signals to be transmitted to the plurality of adjustment members, said first signal monitoring means comprising comparator means for comparing a desired shift setting selected by the user with permissible target shift settings, the signal transmitter means transmitting a shift command signal to the plurality of adjustment members only if the comparator means have detected agreement of the desired shift setting with one of the permissible target shift settings.

18. A device in accordance with claim 17, wherein the signal transmission line means is adapted for serial signal transmission.

19. A device in accordance with claim 18, wherein the signal transmission line means is adapted for electrical signal transmission.

20. A device in accordance with claim 18, wherein the signal transmission line means is adapted for optical signal transmission as a light guide, particularly as a fiberglass cable.

21. A control device for controlling at least one adjustment member of a bicycle, the control device comprising:

signal transmitter means located distant from the at least one adjustment member and being settable by a user into a plurality of shift settings for setting the at least one adjustment member into a plurality of operational positions, signal transmission line means for transmitting signals between the signal transmitter means and the at least one adjustment member, first signal monitoring means assigned to the signal transmitter means and connected with the signal transmission line means, for monitoring the signals to be transmitted to the at least one adjustment member, second signal monitoring means per adjustment member assigned to the respective adjustment member and connected with the signal transmission line means, for monitoring the signals transmitted by the signal transmitter means and for controlling the adjustment member, said second signal monitoring means comprising memory means in which for each operational position of the respective adjustment member a set adjustment value for the adjustment member corresponding to this operational position is stored, said first and second signal monitoring means being located distant from each other, said first signal monitoring means being located at the signal transmitter means and said second signal monitoring means being located at the respective adjustment member, wherein the adjustment member has sensor means for detecting an instantaneous actual adjustment value of the adjustment member, the sensor means being connected with the second signal monitoring means for transmitting the detected instantaneous actual adjustment value, and wherein the second signal monitoring means has comparator means for comparing the instantaneous actual adjustment value with a set adjustment value corresponding to a target shift setting by calculating the difference between the actual adjustment value and the set adjustment value, the control device triggering the adjustment member in accordance with this difference, wherein the second signal monitoring means transmit a signal "command cannot be executed" to the first signal monitoring means, when the comparator means have determined that the adjustment member cannot be adjusted to the set adjusting value, and wherein the second signal monitoring means has time function means which can be set to a predetermined time period as a function of a transmitted shift signal and can be stopped as a function of an agreement, detected by the comparator means, between the instantaneous actual adjustment value and the set adjustment value, and the second signal monitoring unit transmits the signal "command cannot be executed" to the first signal monitoring means after the predetermined time period has elapsed.

* * * * *

UNITED STATES PATENT AND TRADEMARK OFFICE
CERTIFICATE OF CORRECTION

PATENT NO. : 5,483,137
DATED : January 9, 1996
INVENTOR(S) : Rainer Fey and Albert Thein It is certified that error appears in the above-identified patent and that said Letters Patent is hereby corrected as shown below:

Col. 8, line 35, "setting" should read --settings--.

Signed and Sealed this

Twenty-fifth Day of June, 1996

Attest:

BRUCE LEHMAN

Attesting Officer     Commissioner of Patents and Trademarks